(12) United States Patent
Patterson (10) Patent No.: US 11,421,609 B2
(45) Date of Patent: Aug. 23, 2022

(54) SYSTEM AND PROCESS FOR CONTROLLED CHEMICAL IGNITION OF INTERNAL COMBUSTION ENGINES

(71) Applicant: Mark Andrew Patterson, Houston, TX (US)

(72) Inventor: Mark Andrew Patterson, Houston, TX (US)

( * ) Notice: Subject to any disclaimer, the term of this patent is extended or adjusted under 35 U.S.C. 154(b) by 0 days.

(21) Appl. No.: 17/213,543

(22) Filed: Mar. 26, 2021

(65) Prior Publication Data
US 2021/0301739 A1 Sep. 30, 2021

Related U.S. Application Data

(60) Provisional application No. 63/001,405, filed on Mar. 29, 2020.

(51) Int. Cl.
| | |
|---|---|
| *F02D 19/08* | (2006.01) |
| *F02M 25/00* | (2006.01) |
| *F02D 19/06* | (2006.01) |
| *F01N 3/20* | (2006.01) |
| *F02B 19/12* | (2006.01) |

(52) U.S. Cl.
CPC ........... *F02D 19/08* (2013.01); *F01N 3/2006* (2013.01); *F01N 3/2066* (2013.01); *F02B 19/12* (2013.01); *F02D 19/0665* (2013.01); *F02M 25/00* (2013.01); *F01N 2610/03* (2013.01)

(58) Field of Classification Search
CPC combination set(s) only.
See application file for complete search history.

(56) References Cited

U.S. PATENT DOCUMENTS

| | | |
|---|---|---|
| 4,182,278 A | 1/1980 | Coakwell |
| 4,592,318 A | 6/1986 | Pouring |
| 4,647,288 A | 3/1987 | Dillon |
| 4,651,703 A | 3/1987 | Hoppie |
| 4,788,942 A | 12/1988 | Pouring et al. |
| 4,898,135 A | 2/1990 | Failla et al. |
| 5,095,869 A | 3/1992 | Blaser et al. |
| 5,109,817 A | 5/1992 | Cherry |
| 5,117,788 A | 6/1992 | Blaser |
| 5,322,042 A | 6/1994 | di Priolo et al. |
| 5,507,263 A | 4/1996 | Yamazaki et al. |
| 5,862,788 A | 1/1999 | Pouring et al. |
| 6,178,942 B1 | 1/2001 | di Priolo |
| 7,360,509 B2 | 4/2008 | Hashimoto et al. |

(Continued)

*Primary Examiner* — Binh Q Tran
(74) *Attorney, Agent, or Firm* — Madan Law LLC; Jeffrey Streets (57) ABSTRACT

A system includes a combustion apparatus for controlling combustion of a fuel and air in a combustion chamber to produce mechanical motion, a source of a chemical species for supplying a chemical species to be mixed with the fuel and air, a control valve for controlling an amount of the chemical species that is introduced from the source into the fuel and the air, and a controller in communication with the control valve to cause the control valve to introduce the chemical species at a flow rate that will cause auto-ignition of combustion between the fuel and the air in the combustion chamber without use of a spark-producing device. The controller may perform operations embodied as program instructions for controlling the system.

17 Claims, 6 Drawing Sheets

(56) References Cited

U.S. PATENT DOCUMENTS

| | | | |
|---|---|---|---|
| 7,370,609 B2 * | 5/2008 | Kamio | F02D 19/081 |
| | | | 123/3 |
| 7,469,662 B2 | 12/2008 | Thomas | |
| 7,493,886 B2 | 2/2009 | Blank | |
| 7,597,090 B2 * | 10/2009 | Hashimoto | F02M 1/16 |
| | | | 123/577 |
| 8,301,359 B1 * | 10/2012 | Sagar | G05B 19/042 |
| | | | 123/1 A |
| 8,844,498 B2 | 9/2014 | Patterson | |
| 9,567,939 B2 | 2/2017 | Pouring et al. | |
| 9,856,788 B2 * | 1/2018 | Guinther | C10L 10/00 |
| 10,343,515 B2 * | 7/2019 | Kim | B60K 15/03519 |
| 2007/0084423 A1 | 4/2007 | LeBeaux | |
| 2007/0137611 A1 | 6/2007 | Yu et al. | |
| 2008/0017136 A1 | 1/2008 | Sciamanna et al. | |
| 2011/0247325 A1 * | 10/2011 | Lippa | F02D 19/0655 |
| | | | 60/601 |
| 2013/0306028 A1 * | 11/2013 | Monsallier | C10L 1/301 |
| | | | 123/434 |
| 2014/0026846 A1 | 1/2014 | Johnson | |
| 2014/0209057 A1 | 7/2014 | Pouring et al. | |
| 2015/0361926 A1 * | 12/2015 | Eckhardt | F02M 25/14 |
| | | | 123/585 |
| 2017/0037789 A1 * | 2/2017 | Huwyler | F02D 19/0634 |
| 2017/0067425 A1 * | 3/2017 | Abd Elhamid | F02B 43/00 |

* cited by examiner

SYSTEM AND PROCESS FOR CONTROLLED CHEMICAL IGNITION OF INTERNAL COMBUSTION ENGINES

CROSS-REFERENCE TO RELATED APPLICATIONS

This application is a nonprovisional patent application claiming the benefit of U.S. provisional patent application Ser. No. 63/001,405 filed on Mar. 29, 2020, which application is incorporated by reference herein in its entirety.

BACKGROUND

The present disclosure relates to internal combustion engines.

Background of the Related Art

Combustion is a high-temperature exothermic chemical reaction between a fuel and an oxidant that produces oxidized combustion products. While some combustion processes or systems may be designed for the purpose of heat production and transfer, other processes or systems may be designed for the purpose of producing mechanical work. Internal combustion engines and turbines are both rotary mechanical devices that convert forces from the rapidly expanding gases formed by combustion to useful work.

Ignition and control of natural gas and petroleum fuel combustion in modern reciprocating or rotary internal combustion engines is intermittent and typically requires a spark plug that ignites a mixture of fuel and air at specific time during a phase of the engine, or in the case of a diesel engine, the ignition is controlled by timing of fuel injection and the chemical reaction of the fuel directly with combustion chamber air. A turbine engine may utilize continuous combustion and therefore may only need an initial spark or flame to initiate combustion of the fuel and air, but will often include auxiliary ignition to ensure that fluctuations in the air or fuel supply do not extinguish the combustion.

Much attention has been directed at optimizing these processes, since the efficiency of the combustion may determine the amount of useful work that may be performed with the output of the combustion apparatus. For example, an internal combustion engine may turn a crank shaft that drives a transmission and, ultimately, the wheels of an automobile. As another example, the rotational output of an internal combustion engine or a turbine may turn an electrical generator that produces electrical current for transmission and consumption by electronic devices.

BRIEF SUMMARY

Some embodiments provide a system including a combustion apparatus for controlling combustion of a fuel and air in a combustion chamber to produce mechanical motion, a source of a chemical species for supplying a chemical species to be mixed with the fuel and air, a control valve for controlling an amount of the chemical species that is introduced from the source into the fuel and the air, and a controller in communication with the control valve to cause the control valve to introduce the chemical species at a flow rate that will cause auto-ignition of combustion between the fuel and the air in the combustion chamber without use of a spark-producing device.

DETAILED DESCRIPTION

Some embodiments provide a system that injects the chemical intermediates into one or more combustion apparatus at a controlled rate for the purpose of chemically igniting a mixture of fuel and air without use of a spark-producing device. The chemically ignited mixture of fuel and air cause rapid expansion of high-temperature and high-pressure gases that power the engine. For example, the force of the rapidly expanding gases may produce useful work by directing the force against a mechanical component of the combustion apparatus, such as a piston, rotor or a nozzle, or against a turbine blade. It is a technical advantage that combustion of the fuel and air may be controlled with the addition of the chemical intermediates rather than relying upon spark plug-ignition or compression-ignition (also referred to as "autoignition") to cause combustion of the fuel.

In some embodiments, the combustion apparatus may be an internal combustion engine. For example, the rapidly expanding gases apply a force against one or more cylinders of a reciprocating internal combustion engine. Alternatively, the combustion apparatus may be a turbine, wherein the rapidly expanding gases generated within a combustor are ducted such that they can apply a force against a turbine blade to cause rotation. Still further, the combustion apparatus may be a rotary internal combustion engine, a trochoidal or pistonless rotary engine, Wankel engine or any other device designed for the purpose of converting the energy of combustion into the motion of some element of a combustion chamber.

The fuel that is injected into the combustion engine ("combustion fuel") may be any hydrocarbon fuel, such as gasoline, diesel, natural gas, methane, propane, jet fuel, and/or kerosene. Furthermore, the fuel may be obtained from a storage tank, pipeline, or any other pressurized source. A fuel storage tank may be preferable for a mobile application of the system, such as an automobile. Where the fuel is supplied by a fuel pipeline, the system may be limited to use in stationary or fixed applications of the system, such as an electrical generator.

The air that is injected into the combustion engine may be obtained from the surrounding atmosphere, a storage tank, or other compressed air source. For example, the air may be compressed air that is stored in a pressure vessel for release as needed to support the combustion process. Non-limiting examples of an air compressor include a turbocharger, shaft-driven supercharger, and scavenging piston.

In some embodiments, the chemical intermediates may be provided from one or more source, such as a storage tank. For example, if the desired chemical intermediates include aldehydes and peroxides, then the system may include one or more storage tanks containing aldehydes and peroxides that are combined together in one storage tank or held in separate storage tanks. Each individual storage tank would have one or more control valves for controlling the flow of chemical intermediates to one or more precombustion chambers and/or one or more main combustion chambers.

In some embodiments, the chemical intermediates may be produced in a reactor where a controlled ratio of air and one or more reactant chemical species are injected into a reaction chamber having a controlled temperature. In one option, the reactor itself may include a catalyst that participates in the conversion of the one or more reactant to form the chemical intermediates. For example, a catalyst may be included in the reactor to enhance the production of the desired chemical intermediates, such as aldehydes and peroxides. The catalyst may serve to lower the required reaction temperature in the reactor and/or to reduce an amount of energy required to keep the reactor operating at the required temperature to generate the chemical intermediates. In another option, the reactor may have an external heat source that may control the reaction temperature within the reactor.

The chemical species ("reactants") injected into the reactor or reaction chamber for the production of the chemical intermediates may be any hydrocarbon-based chemical species, such as gasoline, diesel, natural gas, propane, jet fuel, and/or kerosene. In one option, the reactant injected into the reactor may either be same as the fuel that is injected into the combustion engine or may be a different one or more reactant species altogether. When the reactant is the same as the fuel, they reactant and fuel may optionally be supplied from the same source. In one example, the combustion engine fuel could be gasoline and the reactant could be propane. In another example, the combustion fuel may be natural gas and the reactant may be condensates or other components of the natural gas, such as butane, that may be separated out of the natural gas prior to use.

The air that is injected into the reactor to support the production of chemical intermediates may be obtained from the surrounding atmosphere, a storage tank, or the outlet of the compressor side of the engine's turbocharger. For example, the air may be compressed air that is stored in a pressure vessel for release as needed to support the production of chemical intermediates. The air supplied to the reactor may either be the same source of air that is supplied to the combustion engine or may be a different source of air. For example, the air supplied to the combustion engine could be atmospheric air and the air injected into the reactor could be compressed air.

The chemical intermediates that are generated from the controlled mixture of reactants and air at the controlled reaction temperature may include formaldehyde and hydrogen peroxide. In general, the ratio of air and fuel provided to the reaction chamber will depend on the particular reactant species that is being used as the carbon source, but the air-to-reactant mass ratio will typically be less than or equal to about 17:1.

The temperature of the chemical reaction within the reactor may be controlled within the range of 1,500 to 2,400 Celsius, depending on the pressure and the type of reactant used, to create chemical intermediates. This temperature may be achieved by heating the reactant and air mixture above 625 C, which would lead to a spontaneous chemical reaction for hydrocarbon reactant species. The flow of gases would then be regulated to produce a rapid expansion of the gases after spending 0.005 to 0.020 s at the reaction temperature. The rapid expansion should produce a temperature of 575 C or less, such that the intermediate species do not continue to react, because this would lead to complete oxidation of the intermediate chemical species into carbon monoxide, carbon dioxide, and water. Control of the mass flow ratio of air and reactant can be achieved by using a source of air and a source of reactant that each have a pressure that is greater than the reaction chamber pressure, and separately metering the flow of air and the flow of reactant through valves to achieve the desired ratio in the reaction chamber. In the case of a liquid reactant, a pump and injector system (typical of those used in automotive applications to inject fuel directly into the combustion chamber) may be used to meter the reactant into the air upstream of the reaction chamber, or to inject the reactant directly into the reaction chamber. The temperature within the reaction chamber may be controlled at a temperature setpoint using an external heating device, such as a simple burner, electric resistive heater, or other heat exchanger. For example, the heater may be used to initiate and control the temperature of the reactor at a temperature setpoint determined to induce the production of the chemical intermediates, such as peroxides and aldehydes.

In some embodiments, the chemical intermediates may be produced in the reaction chamber by igniting a mixture of the reactant and air with a spark plug, glow plug or other energy source, and then quenching the flame using a flame arrester designed to halt the combustion reaction before complete combustion can be achieved. The combustion in the reactor can also be kept continuous after igniting the mixture by regulating the rate of inflow and outflow of gases. In this case, the flame arrester's temperature may be controlled using an air-to-air or air-to-water heat exchanger coupled to an external heat exchanger, if the design does not provide sufficient cooling through natural convection.

The chemical intermediates from either the storage tanks or the output of the reactor may be injected into the fuel stream, pre-combustion chamber, and/or main combustion chamber depending upon the type of fuel that is used in the combustion chamber. If the fuel is gaseous, such as natural gas, the chemical intermediates can be mixed into the fuel header or added to any other gas inlet to the engine. In other embodiments, if the fuel used by the engine is a liquid, such as gasoline or diesel fuel, it may be more expedient to introduce the gaseous chemical intermediates into the engine's air supply. In still other embodiments, if the chemical intermediates are stored as liquids, the liquids could be combined into a liquid fuel stream prior to injection into the combustion chamber.

The flow rate of the chemical intermediates into the fuel stream, pre-combustion chamber, or main combustion chamber may be controlled using calibrated flow-control valves operated with electronical or mechanical actuators. In a reciprocating engine, the flow rate of the chemical intermediates injected into the selected fuel stream, pre-combustion chamber or main combustion chamber may be controlled in response to an exhaust gas temperature from the combustion chamber and/or a power output of the combustion engine. In one option, the power output of the combustion engine or apparatus may be indicated by a rotational speed of the combustion engine or apparatus. In general, the rate at which the chemical intermediates are injected into the selected fuel stream, pre-combustion chamber, or main combustion chamber may be increased in response to the rotational speed of the combustion engine or apparatus being less than a desired or setpoint rotational speed. Similarly, the rate at which the chemical intermediates are injected into the selected fuel stream, pre-combustion chamber, or main combustion chamber may be decreased in response to the rotational speed of the combustion engine or apparatus being greater than a desired or setpoint rotational speed.

In some embodiments, the exhaust gas temperature and pressure may be used to adjust the amount of chemical intermediates as well as engine intake air flow in the case of a turbocharged reciprocating engine, so that combustion may be phased to optimize the operation of the turbocharger relative to the engine. Optionally, the method may be similar to adjusting spark timing to increase or decrease the turbocharger's inlet temperature and pressure in accordance with the desired exhaust emissions and turbine performance. In a turbine or continuous combustion system, the feedback control may be simpler, for example, such that the rate at which the chemical intermediates are injected into the fuel stream, pre-combustion chamber, and/or main combustion chamber may be decreased in response to the exhaust gas temperature being greater than a desired or setpoint exhaust gas temperature. Similarly, the rate at which the chemical intermediates are injected into the selected fuel stream, pre-combustion chamber, and/or main combustion chamber may be increased in response to the exhaust gas temperature being less than a desired or setpoint exhaust gas temperature.

In some embodiments, the combustion engine or apparatus may have one or more pre-combustion chamber, and the chemical intermediates may be introduced into at least one of the pre-combustion chambers at a controlled flow rate using one or more flow control valves. Using the one or more flow control valves, the chemical intermediates may be continuously or intermittently introduced into the pre-combustion chamber. For example, the flow control valves may introduce the chemical intermediates into a pre-combustion chamber in a controlled manner such that the amount of chemical intermediates and the time period over which the chemical intermediates are introduced will ensure repeatable ignition in the one or more pre-combustion chambers.

In some embodiments, a pre-combustion chamber (PCC) may be used to ignite the air and fuel mixture in the main combustion chamber when the air to fuel ratio is too lean to be ignited directly by a spark plug. A combustion engine does not require a pre-combustion chamber if chemical intermediates are providing for chemical ignition because the main combustion chamber may be chemically ignited at fuel/air equivalence ratios of 0.35 to 0.5 and potentially even lower. Currently, PCCs are used to create a small volume with a fuel and air mixture which is easier for a spark plug to ignite, with an equivalence ratio of 0.6 to 1, depending on the size of the engine and available air pressure at the time of ignition. The energy and chemical species ejected from the PCC ignite the fuel and air in the combustion chamber. However, a chemical intermediate reactor system may be added to a combustion engine with a PCC without the need to alter the engine to accommodate the injection of the chemical intermediates into the main combustion chamber. In other words, a pre-combustion chamber does not improve or deter the action of the chemical intermediates, but it may be preferable to retrofit a pre-combustion chamber to accept injection of the chemical intermediates than to modify, redesign or retrofit the main combustion chamber to accept direct injection of the chemical intermediates.

In some embodiments, the chemical intermediates may be introduced into the main combustion chamber to ensure complete combustion, whether or not a pre-combustion chamber uses a spark plug. The chemical intermediates may ignite regions of an air fuel mixture that are not normally ignited by the pre-combustion chamber or by the main chamber spark plug.

In some embodiments, the chemical intermediates may be introduced directly into one or more combustion chambers of the combustion engine or apparatus. The flow rate of the chemical intermediates into the one or more main combustion chambers may be controlled with one or more flow control valves. The one or more flow control valves per combustion chamber may continuously or intermittently inject the chemical intermediates into each combustion chamber. As discussed herein, the chemical intermediates may be injected into one or more combustion chambers of an internal combustion engine to support chemical ignition and meet performance requirements of the internal combustion engine. For example, the flow rate and/or timing of chemical intermediates injection may be controlled in response to an exhaust gas temperature and/or a power output of the combustion engine.

In some embodiments, chemical ignition in either the pre-combustion chambers or the main combustion chambers may be supported by introducing the chemical intermediates into the relevant chamber in a direct or indirect manner. For example, the chemical intermediates may be: (1) separately injected directly into the chamber, (2) added to the fuel stream upstream of where the fuel stream is injected into the chamber, (3) added to the air stream upstream of where the air stream is injected into the chamber, or (4) added to a mixed fuel and air stream upstream of where the mixed fuel and air stream is injected into the chamber.

In some embodiments, the system may further include an exhaust gas recirculation assembly for improving engine efficiency and reducing emissions, such as the emission of nitrogen oxides. The exhaust gas recirculation assembly may include flow metering valves, heat exchangers, and other devices for controlling the temperature and flow rate of exhaust gas that is being returned to one or more combustion chambers. After combustion and extraction of power from the rapidly expanding gases, one or more combustion chambers expel their exhaust gas through valves or ports, which are designed to move the flow out of the combustion chambers and into the atmosphere, with additional devices to control pollutant emissions added as necessary to meet regulations. The amount of chemical intermediates introduced into such an internal combustion engine may be adjusted to account for the typically higher temperature in the combustion chamber of an internal combustion engine in which the hot exhaust gas is recirculated back to the combustion chamber. For example, a lower concentration of the chemical intermediates may be introduced in the internal combustion engine in response to the higher exhaust gas temperature.

In some embodiments, the system may include a controller, such as a computer, that receives input from various sensors and other components of the system and sends control signals to various components of the system. For example, the various sensors may include a plurality of flow sensors, temperature sensors, pressure sensors, and/or composition sensors. Furthermore, the control signals may be sent to various components including the flow control valves that provide air and fuel to the reactor, the flow control valves that control the flow of chemical intermediates from the reactor into the pre-combustion chamber and/or the main combustion chamber, the flow control valves that control the flow of fuel and air to the main combustion chamber, and the flow control valves that control any exhaust gas recirculation. Still other control signals may be provided, such as a control signal to the heater than maintains the temperature of the reactor.

In some embodiments, the control logic may include feedback or feed-forward controls programmed to electronically control any existing flow control valves, in single or multi-cylinder engine configurations, with sensors enabled to detect any one or more of the following: atmospheric pressure, atmospheric temperature, atmospheric humidity, the chemical composition of any gas flowing on the engine assembly, and any temperature and/or pressure of fuel, air, recirculated exhaust, supplied chemical intermediates, coolants, and lubricants. Control strategies may contain lookup tables, mathematical models of device behavior, or other methods devised to calculate the proper settings for all actuators on the engine assembly.

Figure 1:
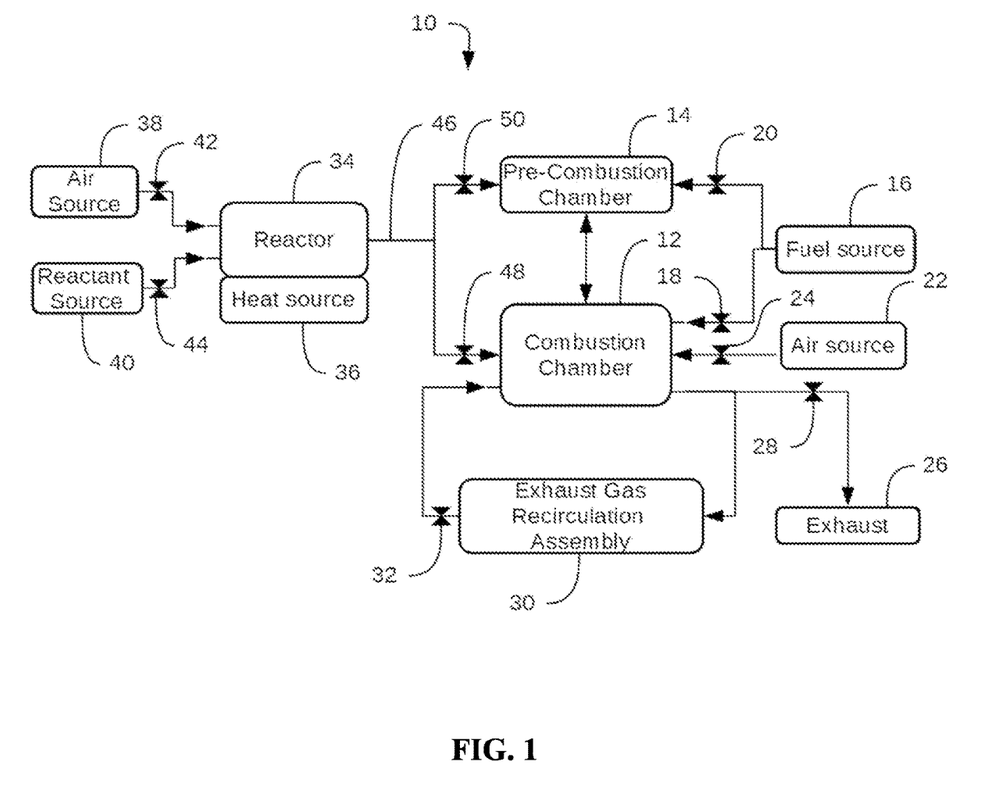
FIG. 1 is a diagram of a system for controlling chemical ignition of an internal combustion engine having a pre-combustion chamber.

FIG. 1 is a diagram of a system 10 for controlling chemical ignition of an internal combustion engine having a combustion apparatus, including a combustion chamber 12 and a pre-combustion chamber 14. A fuel source 16 is connected to both the combustion chamber 12 and the pre-combustion chamber 14 via a tube, hose or pipe through control valves 18, 20, respectively. An air source 22 is connected to the combustion chamber 12 via a conduit through a control valve 24. Accordingly, a control system (not shown; see FIG. 5) may control the operation of the control valves 18, 20, 24 in order to introduce fuel and air into the combustion apparatus at a controller air-to-fuel ratio. The specific manner of metering the fuel and air to the combustion apparatus may include valves, ports, turbocharging, supercharging, and other means of controlling the flow of gases and liquids to the pre-combustion chamber 14 and/or the main combustion chamber 12. While only one instance of the combustion chamber 12 and the pre-combustion chamber 14 are shown, the system 10 may include any number of instances of the combustion chamber 12 and the pre-combustion chamber 14. For example, a 6-cylinder internal combustion engine may include six (6) combustion chambers 12 and six (6) pre-combustion chambers 14. However, the relationship of each of 6 instances of the chambers 12, 14 to the fuel source 16 and air source 24 may be the same as that shown here. Other embodiments of the combustion apparatus may have a different number of chambers 12, 14, as well as corresponding flow lines and valves, depending upon the type of combustion apparatus, the size and design of the combustion apparatus, and whether or not the combustion apparatus includes any pre-combustion chambers at all. Furthermore, some engines, such as a two-stroke reciprocating engine, may have a port rather than a control valve on the air source. Still further, some engines may provide all of the fuel and air to the main combustion chamber and have a passive pre-combustion chamber.

The system 10 further includes an exhaust 26, such as an exhaust pipe, tubing or conduit. After power has been generated from the combustion gases, the gases are exhausted from the one or more combustion chambers 12 and may be combined into one or more exhaust stream. The exhaust gases may flow to the exhaust 26 to be release into the atmosphere. As shown, a control port or valve 28, may be used to redirect some of the exhaust gases to an exhaust gas recirculation assembly 30. A further control valve 32 may also be used to block off or control the flow of exhaust gases through the recirculation assembly 30 as desired.

Still further, the system 10 includes a reactor 34 for the production of chemical species or intermediates that may be used to causes auto-ignition of air and fuel in the combustion apparatus. The reactor 34 may include a catalyst in accordance with one embodiment described above or may include a spark plug and a flame arrestor in accordance with another embodiment described above. Other reactor configurations may be possible. In the embodiment shown, the reactor 34 has an external heat source 36, which may be used to control the temperature inside the reactor 34.

The reactor 34 is coupled to an air source 38 and a reactant source 40 by via a tube, hose or pipe through control valves 42, 44, respectively. A controller (not shown; see FIG. 5) may control the ratio and flow rates of air from the air source 38 and reactant(s) from the reactant source 40 to the reactor 34. The reactants and air are combined in a specific ratio in the reactor 34 to produce chemical species or intermediates consisting of aldehydes and peroxides, among other species. An outlet 46 from the reactor 34 supplies the chemical species to either or both of the combustion chamber 12 and the pre-combustion chamber 14 via a tube, hose or pipe through control valves 48, 50, respectively. The controller may control operation of the control valves 48, 50 supplying the chemical species, the control valves 18, 20 supplying the fuel, and the control vale 24 supplying the air to the combustion chamber 12 and/or the pre-combustion chamber 14 in order to control the ratio of chemical species, fuel and air in order to accomplish auto-ignition of combustion within the pre-combustion chamber 14 and/or combustion chamber 12.

The reactor 34 converts air and the reactant from the reactant source 40 to a mixture of aldehydes, peroxides, and other chemicals which may include residual reactant and air, and other species that result from reactions within the reactor 34. The chemical reaction may be initiated by means of a spark plug or flame, and is sustained through continuous or periodic introduction of air and fuel. Insulation (not shown) and/or the heat source 36 may be used in conjunction with the reactor 34 to maintain a reactor temperature required to generate aldehydes and peroxides.

The reaction products that are produced in the reactor may vary according to the type of hydrocarbon reactant used, the fuel-to-air ratio used, and the temperature within the reactor (i.e., within the reaction chamber). However, hydrocarbon reactants, such as $CH_4$ (methane gas) and air, may be expected to produce reaction products that include $CH_2O$ (formaldehyde), $H_2O_2$ (hydrogen peroxide), CO (carbon monoxide), and $N_2$ (nitrogen gas), with the ratios between these reaction products being dependent upon the amount of available oxygen.

The system 10 may further include any number and placement of temperature, pressure and flow sensors to implement control and operation of the system 10. For example, control of the flow of air from the air source 38 through one or more control valves 42 to the reactor 34 is controlled by a controller, which may adjust the valve 42 by monitoring the pressure, temperature, and flow in the system through a plurality of flow sensors and temperature and pressure sensors, and applying control logic to regulate the valve. Similarly, the controller may regulate the flow of reactant from the reactant source 40 to the reactor 34 by adjusting the position of the flow control valve 44 according to logic applied by the inputs from a plurality of flow sensors and temperature and pressure sensors.

Flow exiting the reactor 34 through the outlet 46 to the optional pre-combustion chamber 14 is regulated using one more multiple flow control valves 50 connected electronically to the controller, which uses the sensed values from flow sensors and temperature and pressure from sensors to control the position of the valve 50. Flow exiting the reactor 34 through the outlet 46 to the combustion chamber 12 is regulated using one more multiple flow control valves 48 connected electronically to the controller, which uses the sensed values from flow sensors and temperature and pressure sensors to control the position of the valve 48.

Figure 2:
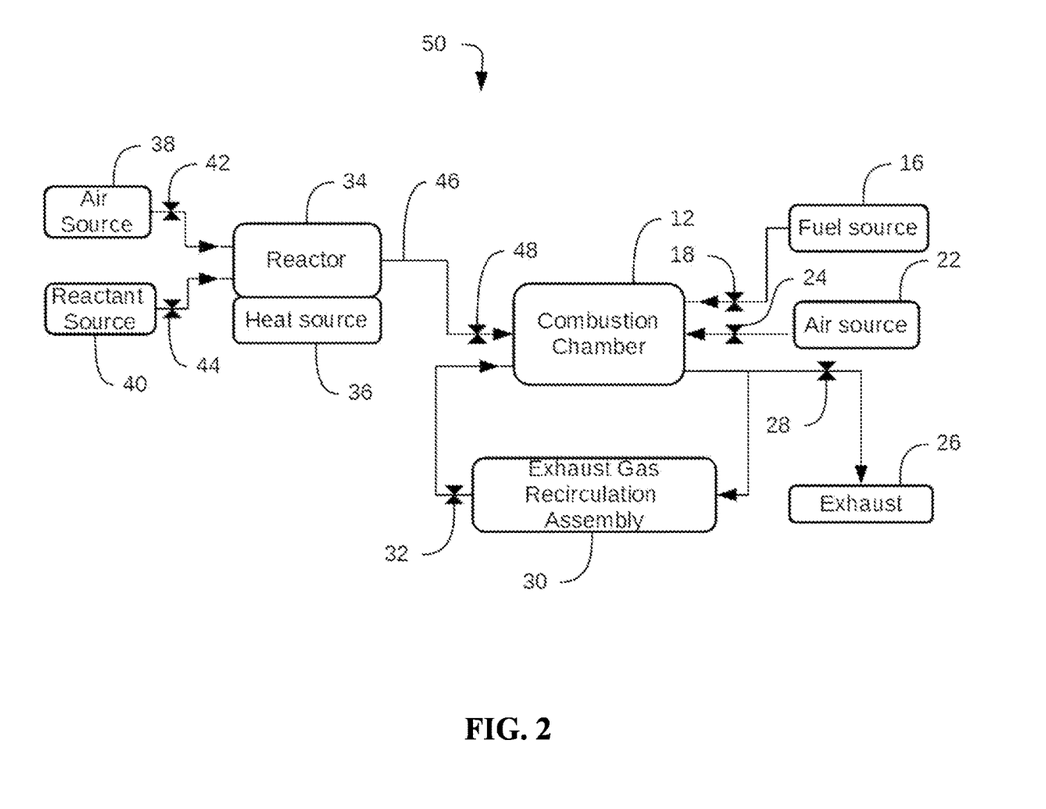
FIG. 2 is a diagram of a system for controlling chemical ignition of an internal combustion engine without a pre-combustion chamber.

FIG. 2 is a diagram of a process or system 50 for controlling chemical ignition of the internal combustion engine 12 without a pre-combustion chamber 14 (as was shown in FIG. 1). However, the remainder of the system 50 may be the same as described in reference to FIG. 1 and the control and operation of the system 50 may be the same as described in reference to FIG. 1. The only difference is that there is no pre-combustion chamber coupled to the main combustion chamber 12, and their corresponding control valves 20, 50 and associated flow lines have been eliminated. Accordingly, system 50 shows that pre-combustion chambers are optional and are not required for the operation of the system 50. Components in system 50 that are the same as those in system 10 are labeled with the same reference numbers.

Figure 3:
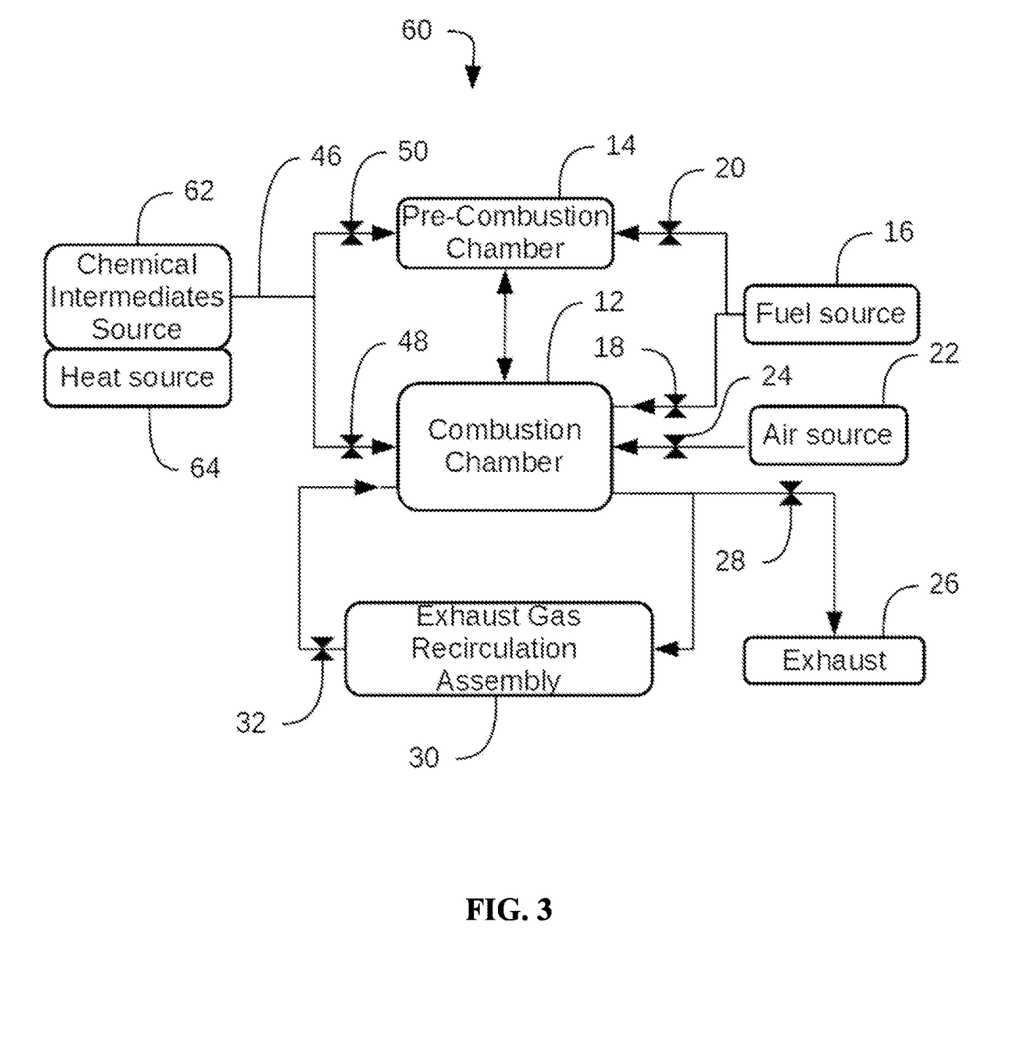
FIG. 3 is a diagram of the system of FIG. 1 where the reactor is replaced with a source of one or more chemical intermediates.

FIG. 3 is a diagram of a process or system 60 that is similar to the process or system 10 of FIG. 1, except that the reactor 34 (shown in FIG. 1) is replaced with a source of one or more chemical species or intermediates ("chemical intermediates source 62"). The chemical intermediates source 62 may be a pressurized storage vessel with a heat source 64. Similar to the system 10, the chemical intermediates from through the outlet 46 to supply the chemical species to either or both of the combustion chamber 12 and the pre-combustion chamber 14 via a tube, hose or pipe through control valves 48, 50, respectively. The controller may control operation of the control valves 48, 50 supplying the chemical species, the control valves 18, 20 supplying the fuel, and the control vale 24 supplying the air to the combustion chamber 12 and/or the pre-combustion chamber 14 in order to control the ratio of chemical species, fuel and air in order to accomplish auto-ignition of combustion within the pre-combustion chamber 14 and/or combustion chamber 12. Components in system 60 that are the same as those in system 10 are labeled with the same reference numbers.

Figure 4:
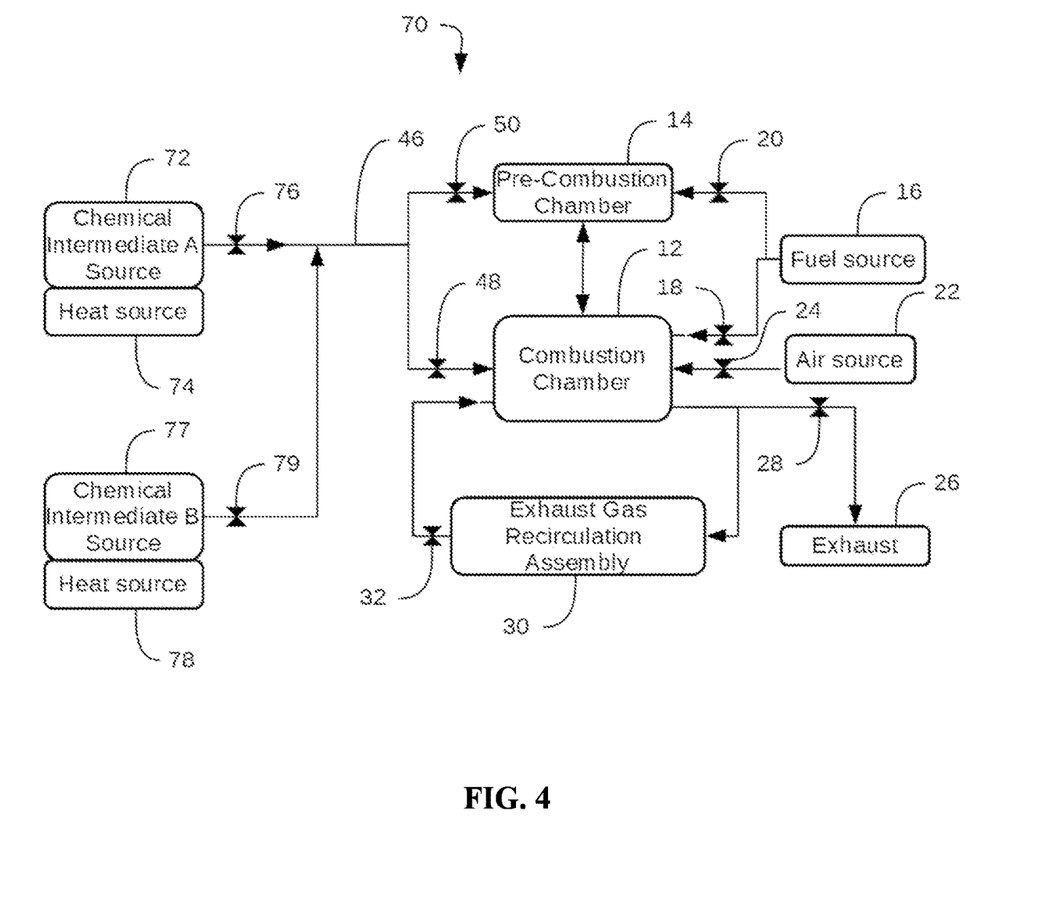
FIG. 4 is a diagram of the process of FIG. 1 where the reactor is replaced with independent sources of multiple chemical intermediates.

FIG. 4 is a diagram of a process or system 70 that is similar to the process or system 60 of FIG. 3, except that the chemical intermediates source 62 is replaced with multiple sources of chemical intermediates, such as a source of chemical intermediate A ("chemical intermediate A source 72") and a source of chemical intermediate B ("chemical intermediate B source 77"). The chemical intermediate A source 72 may have a heat source 74 and the chemical intermediate B source 77 may have a heat source 78. A control valve 76 controls the flow of chemical intermediate A from the chemical intermediate A source 72 to the chambers 12, 14 and a control valve 79 controls the flow of chemical intermediate B from the chemical intermediate B source 77 to the chambers 12, 14. Accordingly, the controller may use the control valves 76, 79 to control the ratio of the chemical intermediates A and B, while still using the control valves 48, 50 to control the amount of the one or more mixed chemical intermediates A and B to the respective combustion chambers 12, 14.

Figure 5:
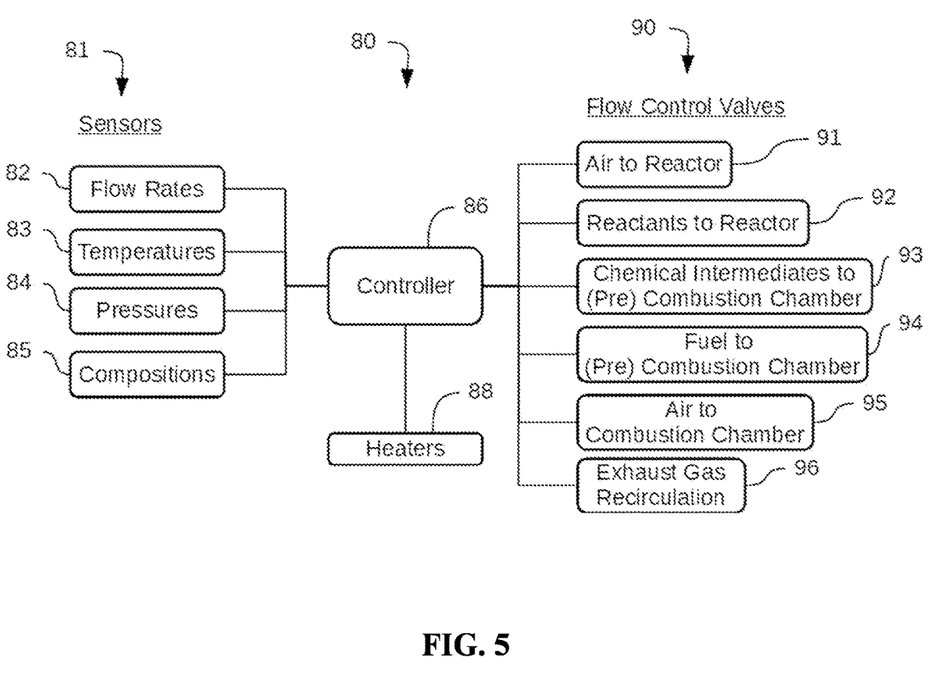
FIG. 5 is a diagram of a control system illustrating various types of sensor input to a controller and various control signals output by the controller to control the process of chemical ignition.

FIG. 5 is a diagram of a control system 80 illustrating various types of sensors 81 providing input to a controller 86 and various flow control valves 90 receiving control signals from the controller 86 to control chemical ignition of the fuel and air in the combustion chambers in accordance with any of the systems 10, 50, 60, 70 or other combinations of the components in these systems. The controller 86, such as a computer, receives input from various sensors and/or other components of one of the systems and sends control signals to various components of the system. For example, the various sensors 81 may include a plurality of flow sensors 82, temperature sensors 83, pressure sensors 84, and/or composition sensors 85. Furthermore, the control signals may be sent to various components including the flow control valves 90. The flow control valves may include an air to reactor control valve (i.e., valve 42 in FIG. 1) 91, a reactants to reactor control valve (i.e., valve 44 in FIG. 1) 92, a chemical intermediates to the pre-combustion chamber control valve (i.e., valve 50 in FIG. 1) and/or a chemical intermediates to the main combustion chamber control valve (i.e., valve 48 in FIG. 1) 93, a fuel to the pre-combustion chamber control valve (i.e., valve 20 in FIG. 1) and/or fuel to the main combustion chamber control valve (i.e., valve 18 in FIG. 1) 94, an air to the combustion chamber control valve (i.e., valve 24 in FIG. 1) 95, and an exhaust gas control valve (i.e., valve 28 in FIG. 1) and/or exhaust gas recirculation assembly control valve (i.e., valve 32 in FIG. 1) 96. Additional valves and/or sensors may be included according to the embodiment. Still other control signals may be provided, such as a control signal to the heaters (i.e., heater 36 in FIG. 1, heater 64 in FIG. 3, or heaters 74, 78 in FIG. 4) 88 than maintains the temperature of the reactor. Accordingly, the controller 86 is able to control the reactant/air ratio and flow rates entering the reactor, the reactor temperature, and the concentration of the chemical intermediates. These are the basic parameters that control the chemical reaction. The controller 86 is also able to control the fuel/air ratio and/or flow rates entering the combustion chambers 12, 14, as well as the flow rates of the exhaust gas through the recirculation assembly 30 and/or the exhaust 26.

Figure 6:
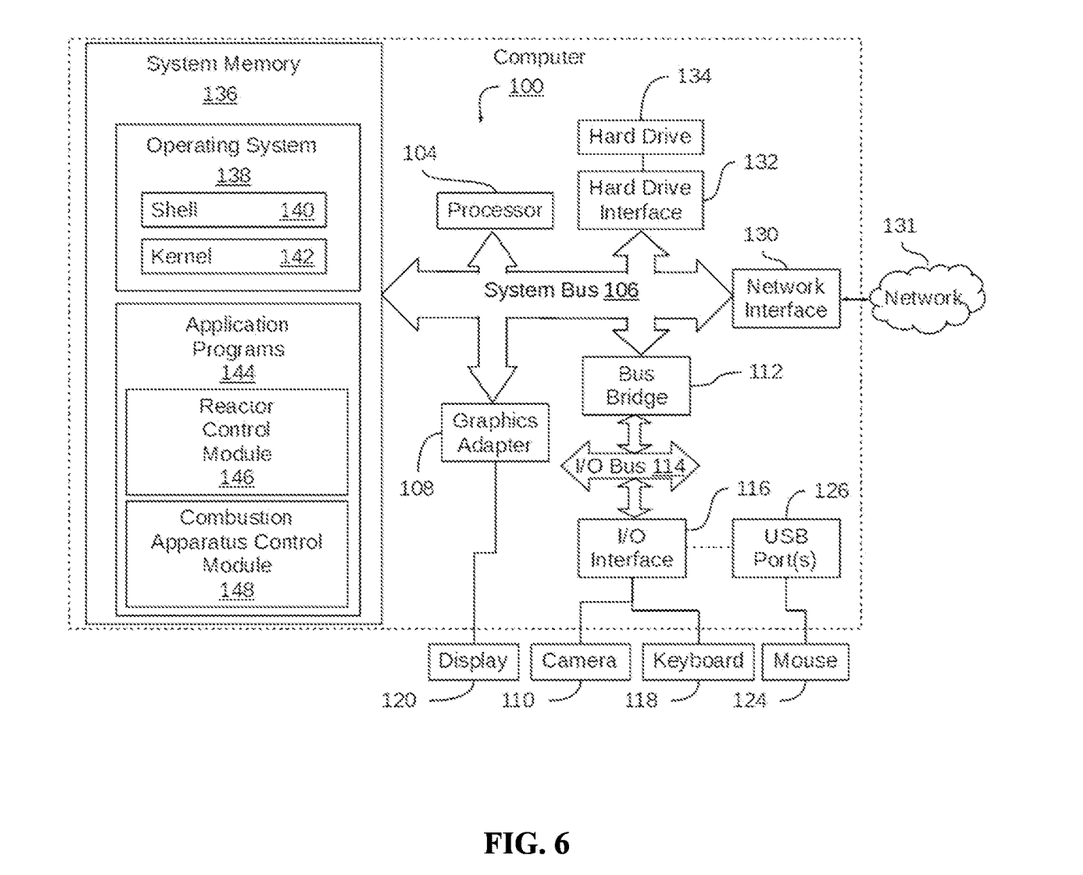
FIG. 6 is block diagram of a computer that may perform various operations to control the process of chemical ignition in accordance with some embodiments.

FIG. 6 is block diagram of a computer 100 that may be representative of the controller 86 of FIG. 5 for performing various operations in accordance with some embodiments. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 131 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions that causes the processor 104 to perform the operations according to one or more embodiments. For example, the application programs 144 may include a reactor control module 146 and a combustion apparatus control module 148.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

The foregoing computer program products may further include program instructions for implementing or initiating any one or more aspects of the methods or systems described herein. Accordingly, a separate description of the methods and systems will not be duplicated in the context of a computer program product.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts/operations specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A system, comprising:
   a combustion apparatus for controlling combustion of a fuel and air in a combustion chamber to produce mechanical motion;
   a source of a chemical species for supplying a chemical species to be mixed with the fuel and air, wherein the source of the chemical species is a reactor having a reactor chamber for producing the chemical species;
   a source of a hydrocarbon reactant coupled to the reactor for controllably introducing the hydrocarbon reactant into the reactor;
   a source of air coupled to the reactor for controllably introducing the air into the reactor for reacting with the hydrocarbon reactant;
   a control valve for controlling an amount of the chemical species that is introduced from the source into the fuel and the air, wherein the reactor has an outlet coupled to the control valve; and
   a controller in communication with the control valve to cause the control valve to introduce the chemical species at a flow rate that will cause auto-ignition of combustion between the fuel and the air in the combustion chamber without use of a spark-producing device, wherein the controller is in further communication with a first control valve for controlling the flow of hydrocarbon reactant from the source of the hydrocarbon reactant to the reactor and a second control valve for controlling the flow of air from the source of the air reactant to the reactor, and wherein the controller causes the first and second control valves to inject a selected ratio of the air to the hydrocarbon reactant into the reaction chamber.

2. The system of claim 1, wherein the chemical species include an aldehyde and a peroxide.

3. The system of claim 1, wherein the combustion apparatus is an internal combustion engine that uses the combustion between the fuel and air to generate mechanical power.

4. The system of claim 1, wherein the combustion apparatus is a turbine that uses the combustion between the fuel and air to generate mechanical power.

5. The system of claim 1, wherein the fuel is selected from gasoline, diesel, natural gas, methane, propane, jet fuel, kerosene, and combinations thereof.

6. The system of claim 1, wherein the source of the chemical species is a storage tank having an outlet coupled to the control valve.

7. The system of claim 6, wherein the chemical species includes an aldehyde and a peroxide, wherein the source of the chemical species includes a first storage tank containing the aldehyde and a second storage tank containing the peroxide.

8. The system of claim 1, further comprising:
   an external heat source, wherein the controller causes the external heat source of control a temperature of the reactor.

9. The system of claim 1, further comprising:
   a catalyst disposed in the reactor, wherein the catalyst participates in the conversion of the hydrocarbon reactant and the air to form the chemical species.

10. The system of claim 1, wherein the hydrocarbon reactant is selected from gasoline, diesel, natural gas, methane, propane, jet fuel, kerosene, and combinations thereof.

11. The system of claim 1, wherein the hydrocarbon reactant and the fuel are the same composition, and wherein the source of the hydrocarbon reactant is the same as a source of the fuel.

12. The system of claim 1, wherein the chemical species include formaldehyde and hydrogen peroxide.

13. The system of claim 1, wherein the ratio of the air to the hydrocarbon reactant is a mass ratio of less than or equal to 17:1, wherein the reaction temperature in the reactor is controlled within the range of 1,500 to 2,400 Celsius, wherein gaseous chemical intermediates formed by the reaction expand rapidly to reach a temperature of 575 Celsius or less to prevent the chemical intermediates from oxidizing.

14. The system of claim 1, wherein the reactor includes a spark plug, glow plug, or other ignition device and a flame arrester, wherein the controller causes the spark plug, glow plug or other ignition device to ignite the hydrocarbon reactant and the air, and wherein the flame arrestor quenches the combustion reaction before complete combustion can be achieved.

15. The system of claim 1, wherein the combustion apparatus includes a pre-combustion chamber coupled to a main combustion chamber, and wherein the chemical species is injected into the fuel, the pre-combustion chamber, and/or the main combustion chamber.

16. The system of claim 1, wherein the controller causes the control valve to introduce the chemical species at a flow rate that is responsive to an exhaust gas temperature from the combustion chamber, a power output of the combustion apparatus, and/or a rotational speed of the combustion apparatus.

17. The system of claim 16, further comprising:
an exhaust gas recirculation assembly for returning a portion of exhaust gases from the combustion chamber to back into the combustion chamber, wherein the controller causes the control valve to introduce the chemical species at a flow rate that is responsive to the exhaust gas temperature from the combustion chamber.

\* \* \* \* \*